Figure 1:
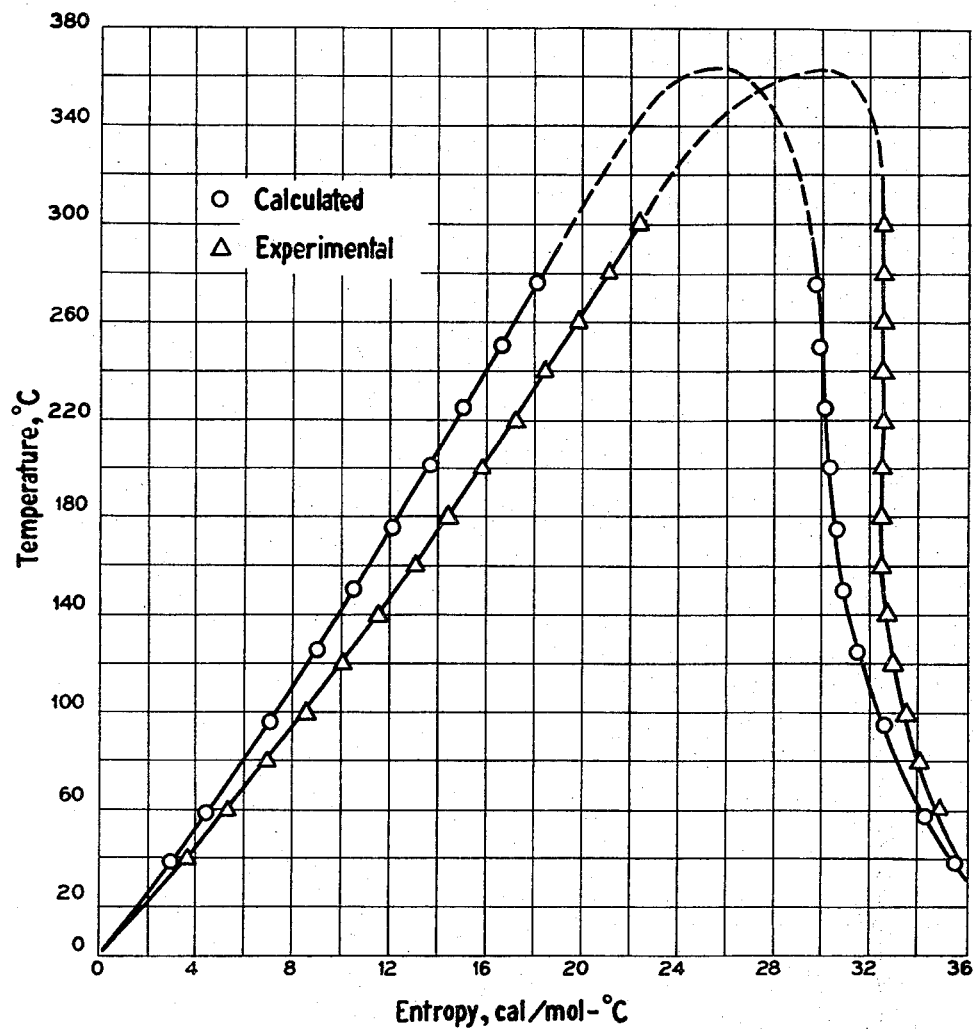

United States Patent [19]

Somekh

[11] 3,841,099
[45] Oct. 15, 1974

[54] WORKING FLUIDS FOR EXTERNAL COMBUSTION ENGINES

[75] Inventor: George S. Somekh, New Rochelle, N.Y.

[73] Assignee: Union Carbide Corporation, New York, N.Y.

[22] Filed: Oct. 17, 1973

[21] Appl. No.: 407,144

Related U.S. Application Data

[63] Continuation-in-part of Ser. No. 100,699, Dec. 22, 1970, abandoned, which is a continuation-in-part of Ser. No. 862,526, Sept. 30, 1969, abandoned.

[52] U.S. Cl. ............................. 60/671, 252/67
[51] Int. Cl. .................................... F01k 25/06
[58] Field of Search ........................... 60/36

[56] References Cited
UNITED STATES PATENTS
3,516,248   6/1970   McEwen ............................. 60/36

*Primary Examiner*—Edgar W. Geoghegan
*Assistant Examiner*—Allen M. Ostrager
*Attorney, Agent, or Firm*—Bernard Francis Crow

[57] ABSTRACT

Water-pyridine mixtures containing about 25 to 90% by weight of pyridine have been found to be excellent working fluids for external combustion engines. Methyl substituted pyridines such as 2-methyl pyridine, 4-methyl pyridine, or 2,6-dimethyl pyridine, as well as 1,2-diazine, 1,3-diazine and 1,4-diazine can be substituted for pyridine itself.

11 Claims, 15 Drawing Figures

SIMPLIFIED FLOW DIAGRAM WITH WATER-PYRIDINE AZEOTROPES AS WORKING FLUID IN BASIC CYCLE SYSTEM

Temperature-Entropy Diagram for
60wt. % Pyridine-40wt. % Water

*SIMPLIFIED FLOW DIAGRAM WITH WATER AS WORKING FLUID*

*SIMPLIFIED FLOW DIAGRAM WITH PYRIDINE AS WORKING FLUID*

*SIMPLIFIED FLOW DIAGRAM WITH WATER-PYRIDINE AZEOTROPES AS WORKING FLUID IN BASIC CYCLE SYSTEM*

TEMPERATURE-ENTROPY DIAGRAM FOR PYRIDINE

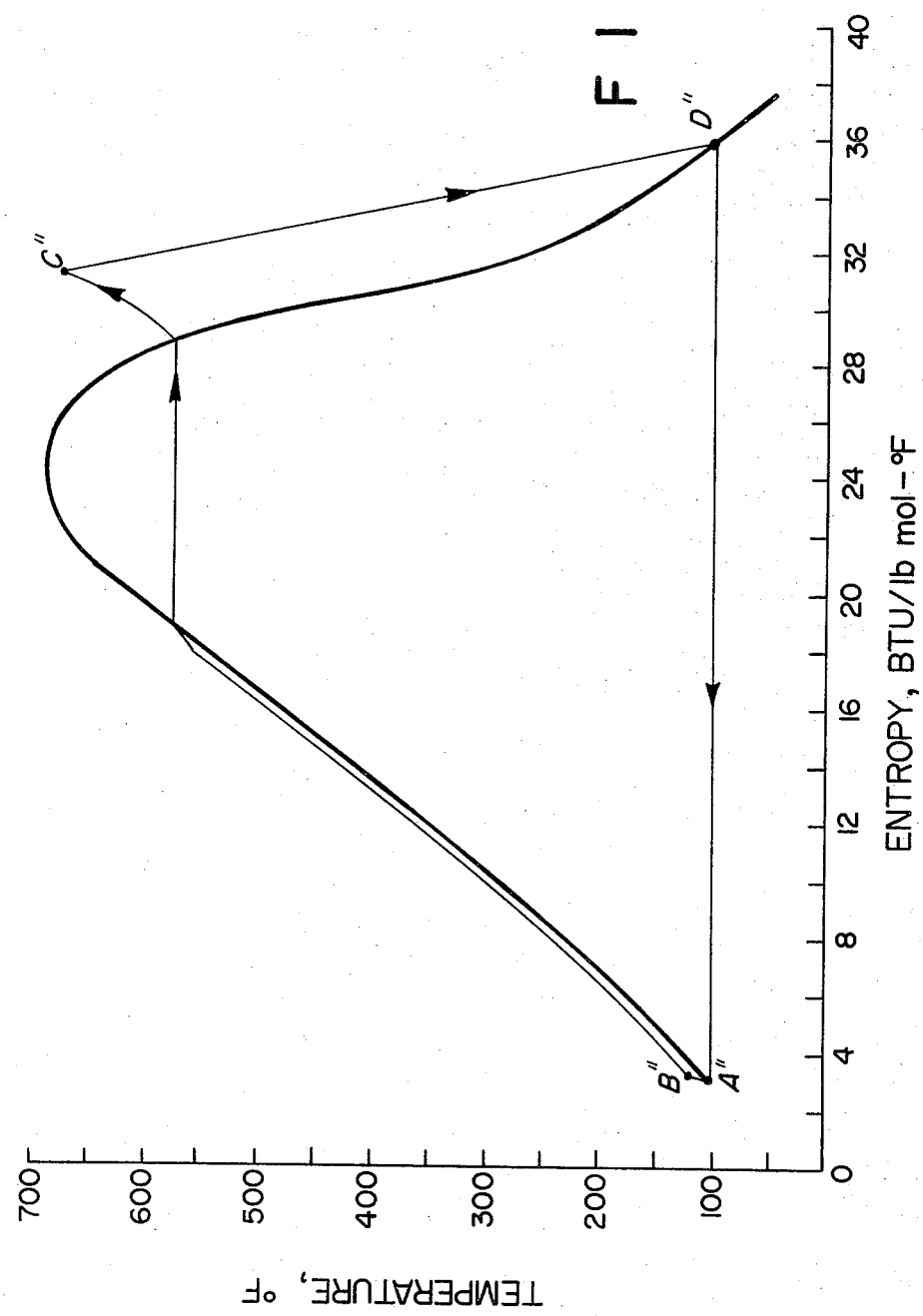

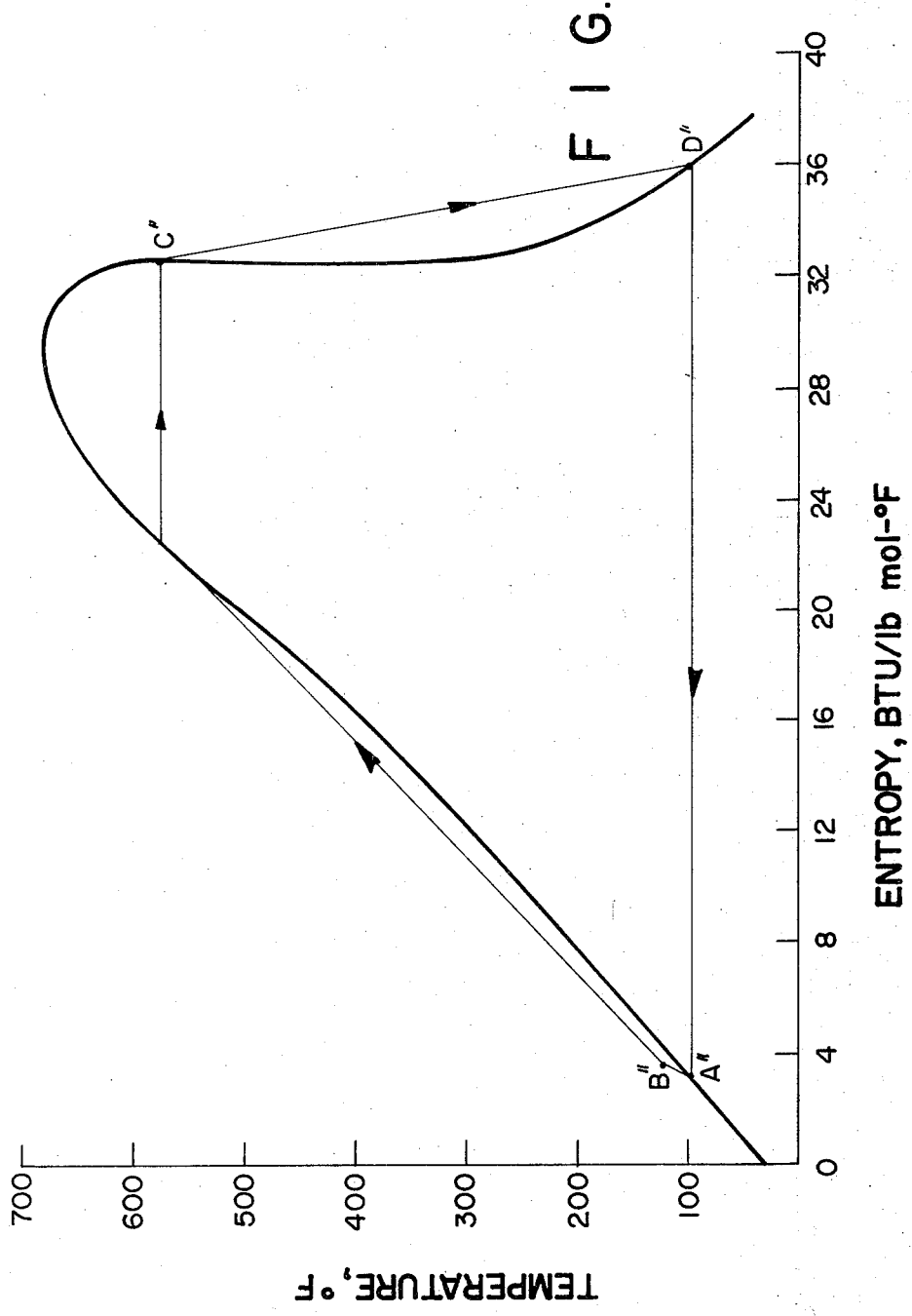

VAPOR-LIQUID EQUILIBRIA IN THE WATER-PYRIDINE SYSTEM 758 mm. Hg PRESSURE

VAPOR-LIQUID EQUILIBRIA IN AN IDEAL SYSTEM

WORKING FLUIDS FOR EXTERNAL COMBUSTION ENGINES

This is a continuation-in-part of Ser. No. 100,699 filed Dec. 22, 1970 now abandoned which in turn is a continuation-in-part of Ser. No. 862,526 filed Sept. 30, 1969 now abandoned.

This invention pertains to working fluids for use in externally heated engine systems and in particular to their use in automotive Rankine Cycle engine systems.

In another aspect, the invention relates to working fluids in power systems using all types of engines (such as, for example, turbines or reciprocating engines) as the prime mover in the power system, which utilizes a vapor-liquid engine cycle. Rankine Cycle engine systems and their advantages are described in many textbooks, as for example, "Engineering Thermodynamics" by J. B. Jones et. al. pages 598–617, John Wiley & Sons Inc. (1960) which is incorporated herein by reference.

The following properties are required for a commercially acceptable working fluid for use in Rankine Cycle engine systems:

1. Low molecular weight
2. Low freezing point
3. High flash point
4. Moderate viscosity
5. Near-vertical saturated vapor line on a temperature-entropy diagram
6. High thermal decomposition temperature
7. Non-corrosive to Rankine Cycle system hardware.

It has now been found that the criteria delineated above are satisfied by binary aqueous solutions containing about 25% to about 90% by weight of certain nitrogen-containing normally liquid hydrocarbons, viz., pyridine, 2-methyl pyridine, 3-methyl pyridine, 4-methyl pyridine, 2,6-dimethyl pyridine, 1,2-diazine, 1,3-diazine and 1,4-diazine.

Thus the molecular weight of the components of these binary solutions is no greater than about 100.

The freezing points of these binary solutions lie in the range of about −65 to about −5°C.

The flash points of these binary solutions lie in the range of about 35 to about 57°C.

The viscosities of these binary solutions lie in the range of about 0.35 to about 0.55 centipoises at 100°C.

The saturated vapor line of a binary solution containing 74.5 wt. % of pyridine and 25.5 wt. % of water on the temperature-entropy diagram of FIG. 1 can be seen to be nearly vertical.

These binary solutions are thermally stable up to temperatures of about 400°C.

These binary solutions are non-corrosive to steel up to about 400°C.

In contrast neither water alone nor any of the nitrogen-containing liquid hydrocarbons listed above alone satisfy all of these criteria which are de rigeur for working fluids in Rankine Cycle engine systems. Thus for example the freezing point of water renders it useless for the operation of Rankine Cycle engine systems in cold weather.

Water is impractical as a working fluid because of its high freezing point and low vapor pressures near its freezing point.

The corrosive effects of steam on ferrous surfaces at elevated temperatures have necessitated the use of costly alloys in the fabrication of the Rankine Cycle system hardware.

Figure 5:
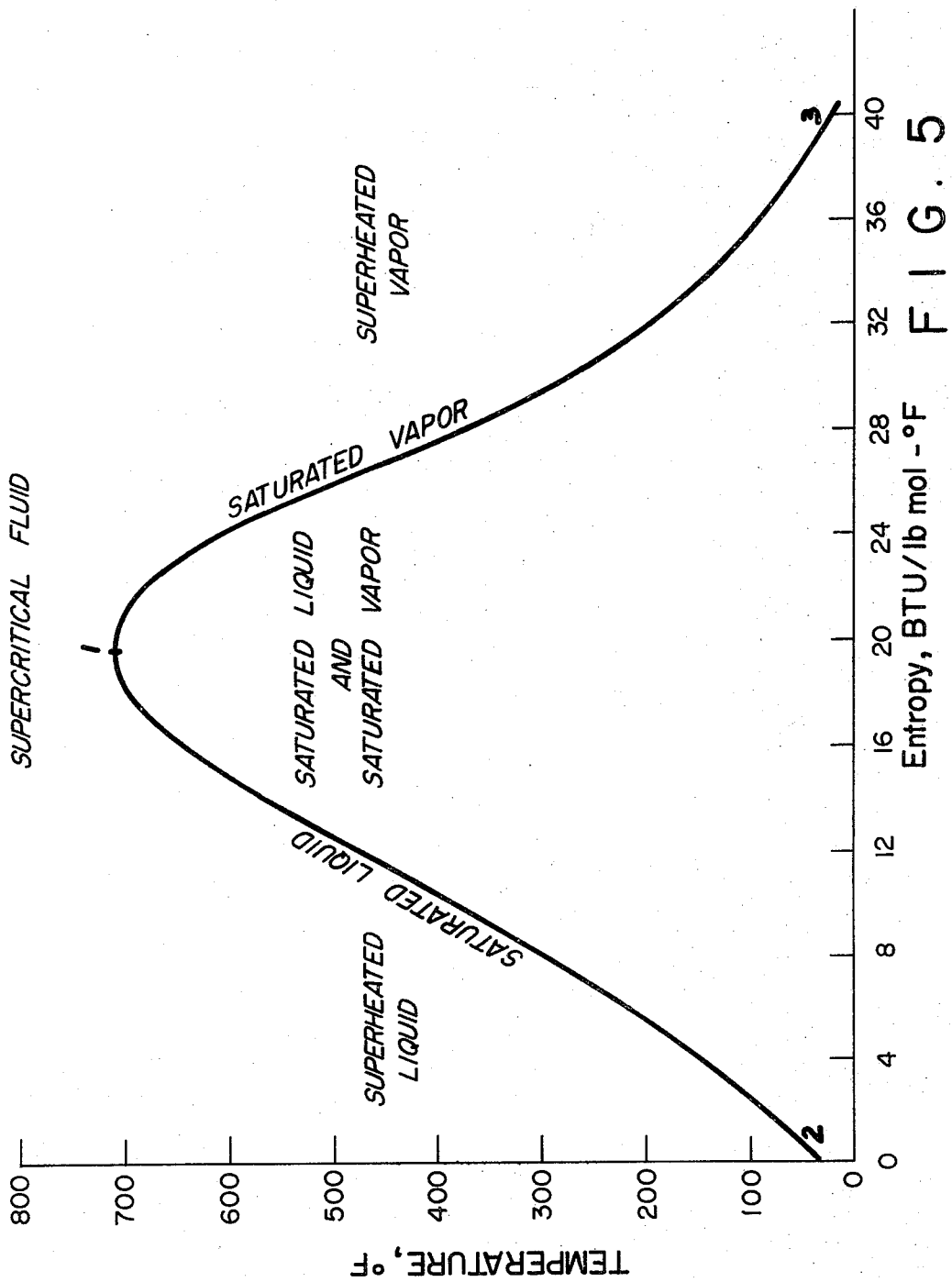

The saturated vapor line of steam on a temperature-entropy diagram deviates considerably from the vertical, as shown in FIG. 5, which demonstrates cycle inefficiency due to condensation during expansion.

Figure 6:
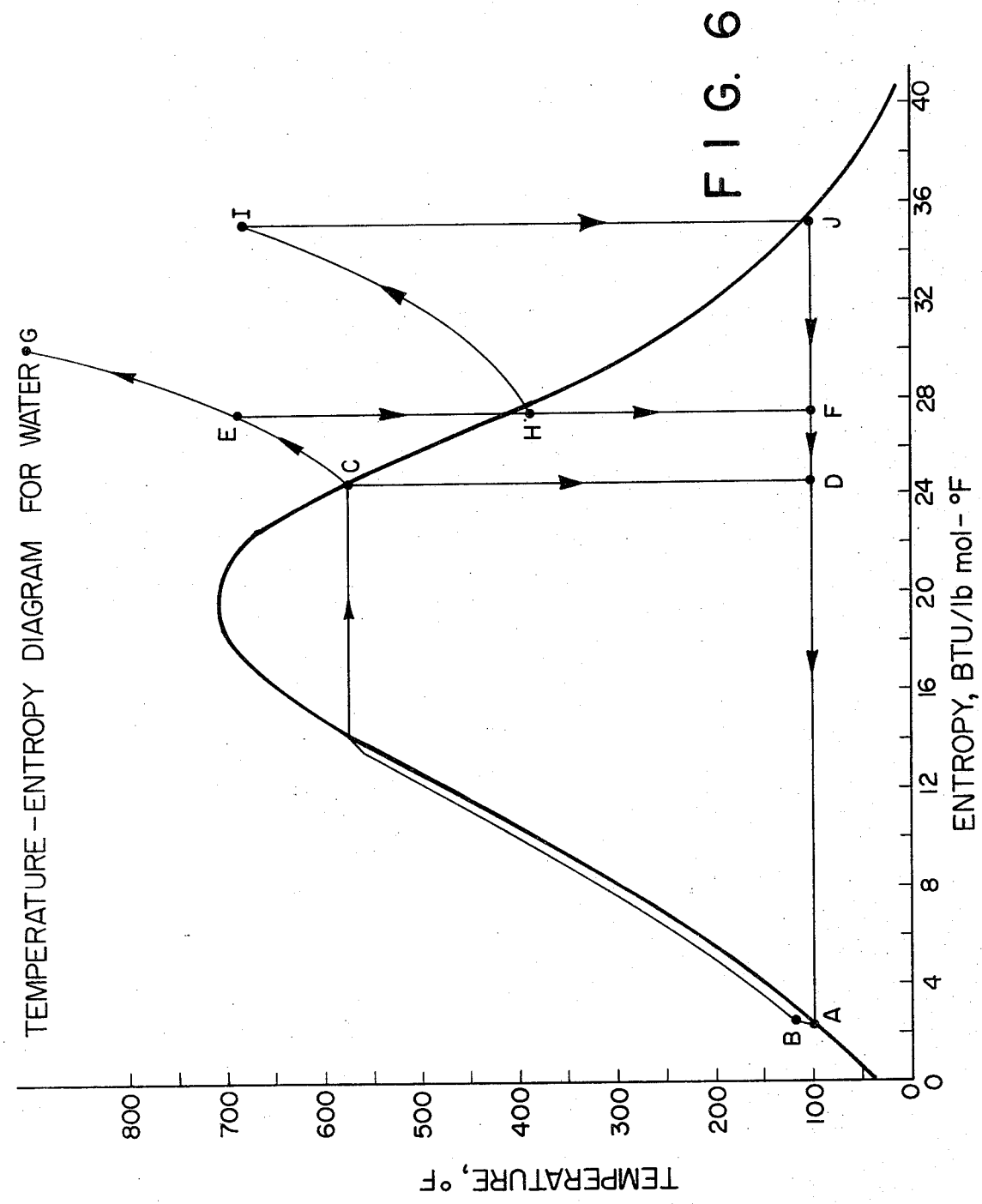

As shown in FIG. 6, the horizontal slope of the stam saturation line requires greater relative superheat in steam systems necessitating operating temperatures of about 800°F. to 1000°F.

The nitrogen-containing liquid hydrocarbons listed above are unsatisfactory when used alone as working fluids in Rankine Cycle engine systems because of their low flash points. But even more important is the undesirable temperature-entropy diagram of these hydrocarbons as exemplified by pyridine in FIG. 8.

Figure 7:
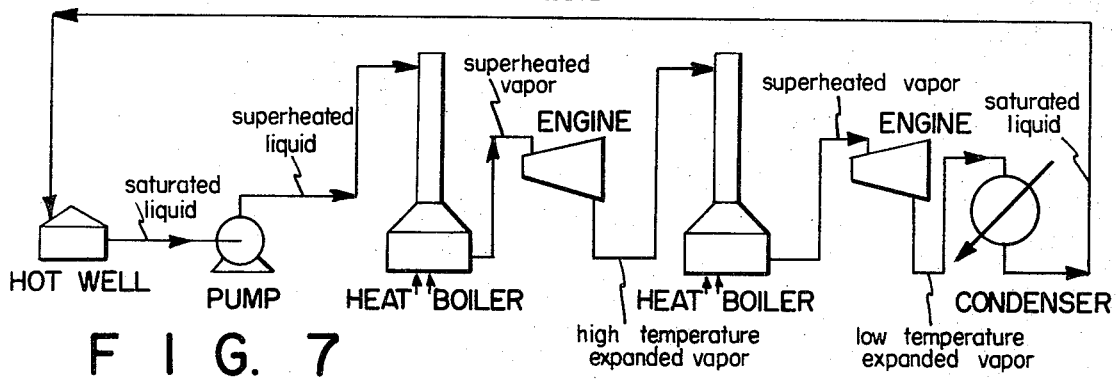
Figure 9:
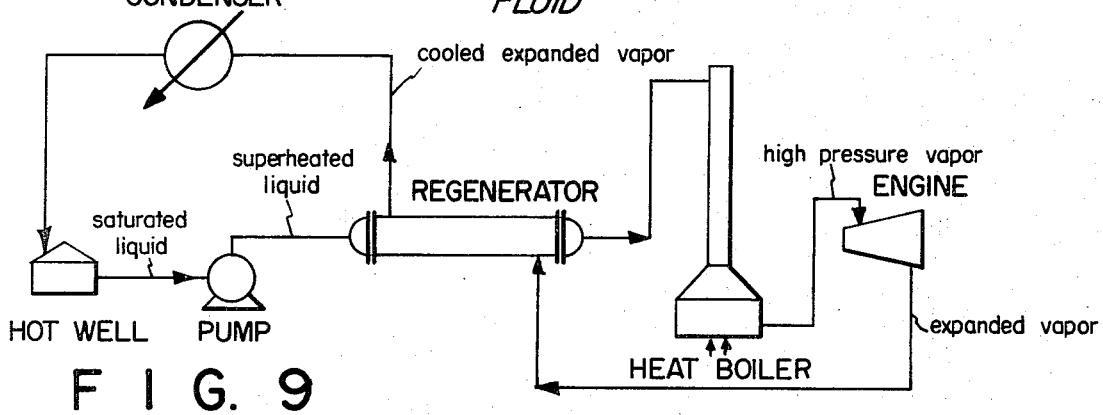
Figure 12:
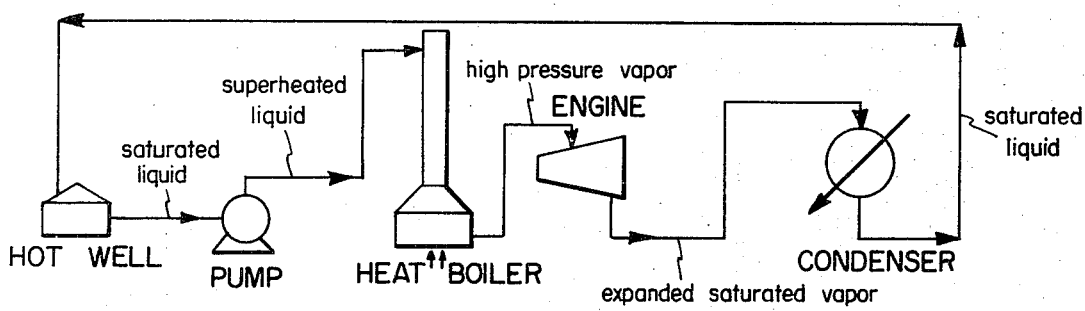

The superiority of the combination of water and these nitrogen-containing liquid hydrocarbons as working fluids in a Rankine Cycle system over either component alone is further demonstrated in FIGS. 7, 9 and 12. It can be seen from these figures that in respect of the complexity of the equipment required, aqueous pyridine solutions provide the simplest and most economical arrangement of mechanical or hardware components. Thus aqueous pyridine solutions (FIG. 12) require only five mechanical components, viz., a heat boiler, an engine, a condenser, a hot well and a pump. Water alone (FIG. 7) however requires seven mechanical components because of the extra heat boiler and engine. While pyridine alone (FIG. 9) requires six mechanical components because of the necessity of using a regenerator.

Although aqueous solutions containing about 25% by weight to about 90% by weight of nitrogen-containing liquid hydrocarbon can be used in the practice of this invention, it is preferred to use solutions containing about 40 to about 90 wt. % or even more preferred to use solutions containing about 50 to about 80% by weight of hydrocarbon and most preferred to use solutions containing a range of about 55 to about 60% by weight of hydrocarbon.

The compounds which serve as the nitrogen-containing liquid hydrocarbons in this invention are readily soluble in water, are chemically unreactive with water, thermally stable up to about 400°C., non-corrosive towards aluminum alloys in particular and ferrous alloys in general at elevated temperatures, form aqueous azeotropic solutions whose saturated vapor lines on a temperature-entropy diagram are nearly vertical, exhibit satisfactory thermal conductivity and have molecular weights of less than about 120.

The preferred mono-cyclic nitrogen-containing liquid hydrocarbon meeting the criteria recited in the preceding paragraph is pyridine. While pyridine alone has been suggested as a working fluid for Rankine Cycle engine systems in the prior art, it is inferior to aqueous pyridine solutions containing about 25 to about 90% by weight of pyridine as will be shown in the discussion which follows later.

Other mono-cyclic nitrogen-containing liquid hydrocarbon working fluids which can also be used in the form of aqueous solutions include 2-methyl pyridine, 3-methyl pyridine, 4-methyl pyridine, 2,6-dimethyl pyridine, 1,2-diazine, 1,3-diazine and 1,4-diazine. It is to be noted that one cannot arbitrarily follow a homologous series in choosing satisfactory nitrogen-containing liquid hydrocarbons for use in the aqueous working fluids of this invention as evinced by the fact that the following are unsatisfactory: 2,4-dimethyl pyridine, 2,5-dimethyl pyridine, 3,4-dimethyl pyridine, 3-ethyl pyridine, 4-ethyl pyridine, 4-ethyl-2-picoline, 5-ethyl-2-picoline, and 1,3,5-triazine because they are either immiscible with water or actually decompose in water as is the case of 1,3,5-triazine. The prior art also suggests the use of 1,3,5-triazine alone as a satisfactory motive fluid which further points up the narrow and unexpected selectivity required in the choice of mono-cyclic nitrogen-containing liquid hydrocarbon working fluids which can be used herein.

A particularly important advantage of the working fluids of the instant invention is that they can be employed in power systems for self-propelled vehicles and do not give off large amounts of waste products which would further contaminate the polluted air surrounding many of our metropolitan areas today. The heating plants for such systems emit a substantially lower amount of pollutants to the air than do internal combustion engines. External combustion engines can employ more air and longer burning times than the conventional internal combustion engines used today, thus permitting a much cleaner exhaust.

The basic Rankine Cycle engine system is composed of a boiler to convert the working fluid from a liquid to vapor and thus impart working energy, a prime mover to operate from the working energy of the working fluid, and a condenser to reconvert the spent vapor back into liquid form. The boiler can be heated in a number of ways including but not limited to the burning of conventional fuels and nuclear power. The prime mover can be a turbine engine or a reciprocating piston engine. In a binary cycle, the condenser can be a heat exchanger wherein the high temperature fluid is converted from vapor back to liquid and the low temperature fluid used to pick up conventional heat energy from this transformation. Ordinarily, the condenser is water or air cooled.

A high temperature fluid is one which when employed in a binary cycle possesses a boiling point higher than the other fluid in the cycle. In like manner, a low temperature fluid of a binary cycle is one having a lower boiling point than the other fluid of the cycle. No precise standards can be given for the terms are relative. A binary cycle can be successfully carried out by using one fluid for the high temperature end of the cycle and another fluid for the low temperature end. Thus, a plurality of prime movers, i.e., turbines or reciprocating engines, can be utilized in the same system. Here, the high temperature fluid, after passing through a turbine section in an expanded state, is condensed by counter-current heat exchange with the companion low temperature fluid. This fluid goes through a second turbine section, then is condensed with water and pumped back to the heating unit.

The heating unit in these systems can be a low grade gas combustion operation such as combustion from natural gas. It can also be a nuclear heating unit. The function of the heating unit is to transfer heat to the working fluids to enable them to activate a prime mover.

Presently, extensive research is being conducted to find alternatives to the internal combustion engine. Basic Rankine Cycle systems using turbine expanders and reciprocating engines are being developed. Steam as the working fluid is being investigated for feasibility by representatives of the automotive industry. Other investigators have been studying the use of fluorocarbons as the working fluid in turbine expanders and reciprocating engines.

Much research is also being conducted today for operational power systems in space vehicles. Here, the size and weight of the power system is a primary consideration. The smaller, lighter engine is permissible when the instant working fluids are utilized to take advantage of the high efficiencies which they provide.

It is to be emphasized that the invention resides not in any particular power system or apparatus but rather in a new class of working fluids which can be employed in a system having an external combustion engine as its driving force, such as a turbine or reciprocating engine. The system is enhanced by full utilization of the properties of the instant working fluids rather than by any manipulation or readjustment of the equipment used to produce electrical power.

Temperature-entropy diagrams are used by those skilled in the art for evaluating working fluid performance in a Rankine Cycle system. Temperature-entropy diagrams and their significance are discussed in standard textbooks, such as "Fundamentals of Classical Thermodynamics" by G. J. Van Wylen and R. E. Sonntag, published by John Wiley.

The efficiency of the working fluids of this invention is demonstrated in FIG. 1 which is a temperature-entropy diagram for a solution of 74.5 wt. % pyridine and 25.5 wt. % of water. This composition has an average molecular weight of 42.44. The calculated curve was prepared assuming the properties of the two components are additive on a molar basis. The experimental curve was prepared using experimental liquid heat capacities. The saturated vapor curve is nearly vertical, so that adibatic expansion of slightly superheated vapors will not produce liquid in the exhaust of automotive engines operating at steady state. Compositions of about 75 wt. % pyridine are recommended for use in environments where ambient operating temperatures can be low, that is, about −10 to about −40°C.

Figure 2:
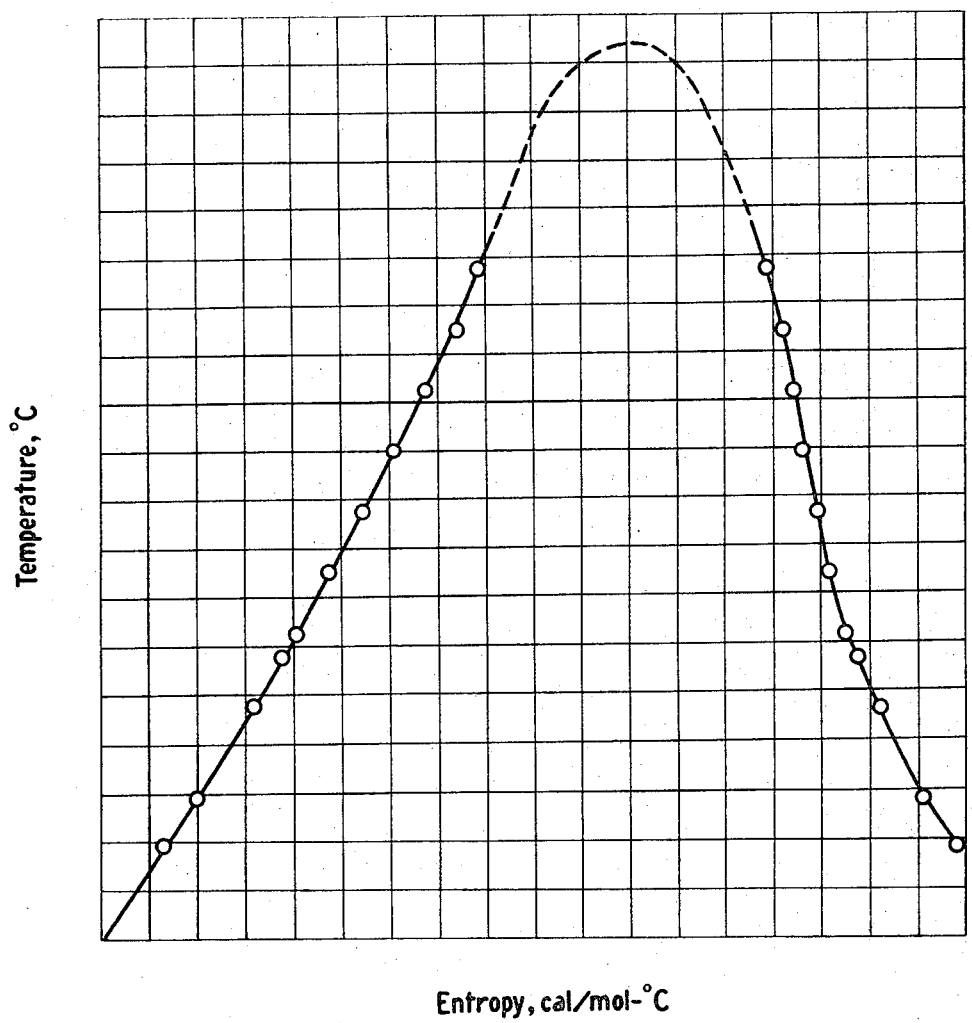

FIG. 2 is a temperature-entropy diagram for a pyridine water solution containing 60% by weight of pyridine. Again the saturated vapor curve is nearly vertical indicating that expansion of saturated or slightly superheated vapors would result in vapors that have neither excessive superheat nor excessive condensate. It is important to note that the pyridine-water composition containing about 60 wt. % pyridine is about that of the minimum azeotrope. This azeotropic system is of great practical advantage inasmuch as it reduces the possibility of pyridine or water becoming separated and concentrated as such in any part of a Rankine Cycle System. The other nitrogen-containing liquid hydrocarbon motive fluids of this invention also enjoy this property of forming azeotropes with water.

Rankine Cycles are described for water with reference to the temperature-entropy diagram of FIG. 5.

Point 1 represents the critical temperature. The curve 1–2 represents the saturated liquid. Curve 1–3 represents the saturated vapor. In the region to the left of curve 1–2, superheated liquid exists. The region between the two curves contains both saturated liquid and saturated vapor. The region to the right of curve 1–3 contains only superheated vapor. All of the region above point 1 is referred to as the supercritical zone. The fluid in this zone is also superheated. However, supercritical fluid tends to have properties between liquid and vapor.

FIG. 6 is a temperature-entropy diagram showing Rankine Cycle operations. Saturated liquid at the condenser temperature and relatively low pressure is depicted at point A. This liquid is pumped to the boiler pressure at B by a high-pressure pump. Point B is slightly above the saturated liquid curve. The pressurized liquid then passes into the boiler where it is first heated and then vaporized to point C, where it is all saturated vapor. The vapor can then be expanded down to the condenser pressure and temperature at point D by passing through an engine. This engine is well insulated so that there is little heat loss. The expansion is then said to be adiabatic and isentropic so that the ideal expansion is represented by a vertical line on the temperature-entropy diagram. The vapor present at point D is then condensed back to point A.

With water, such an expansion is rather impractical and is not done in real operations. Problems result from the fact that liquid water is obtained in the expansion of saturated steam. If a turbine expander is employed, vapor velocities are so high that the water droplets that are formed actually erode the turbine blades. If a reciprocating expander is used, the large proportion of water that is formed tends to remove lubricant from the piston walls. Since liquid water is a poor lubricant, the reciprocating expander would wear out quickly.

In an attempt to circumvent these problems the vapor at C can be moderately superheated to E. However, expansion of E down to F still results in the same problems, but to lesser degrees. Heating the vapor from E up to G does not avoid the problems completely. Furthermore, very high pressures are involved at G, and the boiler tubing has to be very thick-walled.

In central-station power plants expansion into the liquid-vapor zone is reasonably well avoided by expanding part-way along EF, stopping at H and preheating the expanded vapor to I. Expansion of vapors at I down to J avoids any deleterious proportion of liquid ("moisture") in the exhausted steam. Of course, the essentially saturated vapor at J is then condensed. The HIJF area is referred to as a "reheat cycle". It increases the complexity of the power plant and requires additional investment for boilers and expanders to get around the problem of liquid in the expander.

It should be noted that expansions down to D, F, H or J are depicted as ideal expansions in that the expansion lines are vertical. Real expansions do, however, involve some increase in entropy. This results from nonidealities in the expander. Thus, each of the points D, F, H and J would be located to the right of where they are actually shown in FIG. 6. Nevertheless, points D and F would still be well in the Liquid-vapor region. Only points H and J would be safe operating points. A simplified flow diagram of the system with water as a working fluid is shown in FIG. 7.

Figure 8:
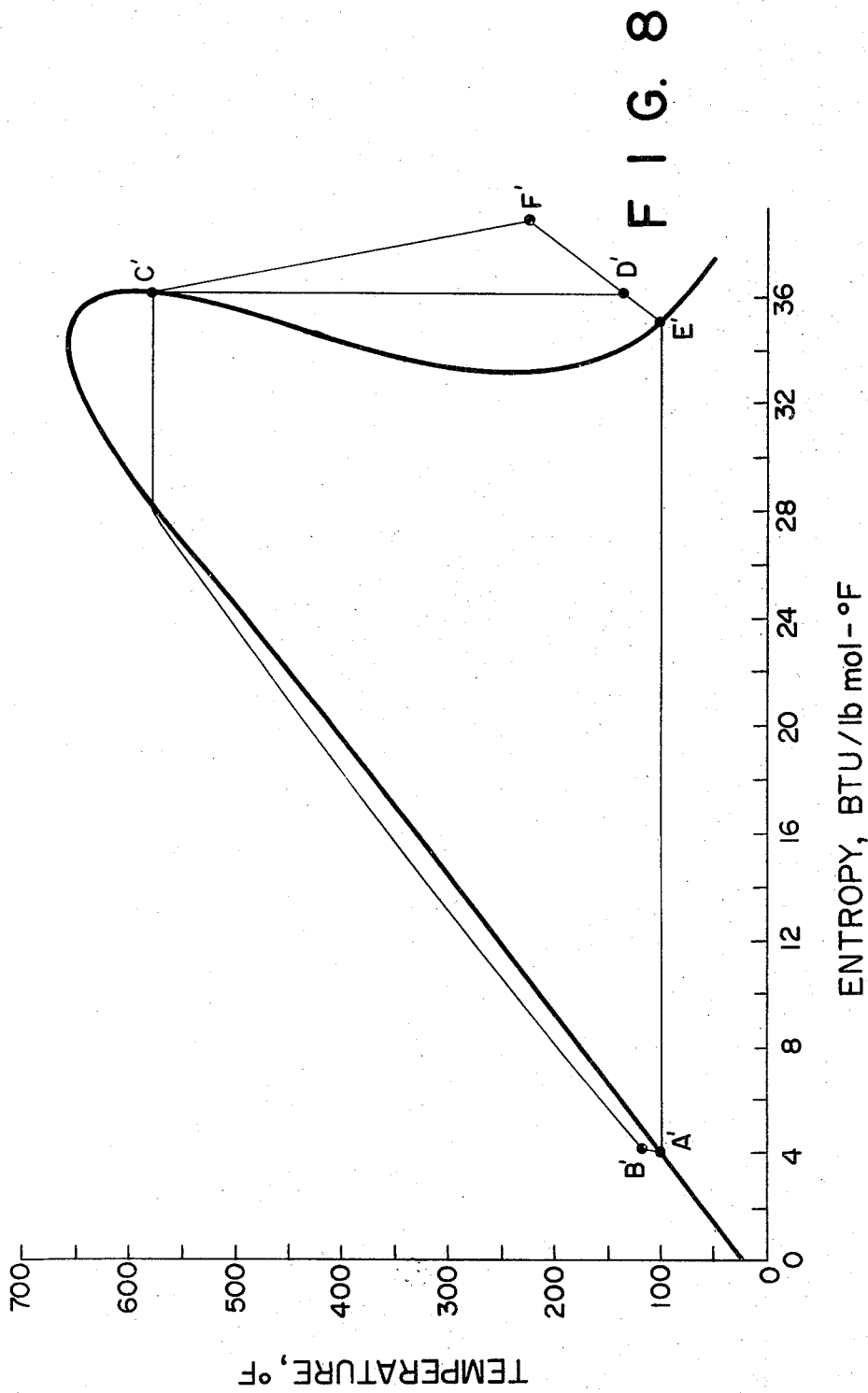

FIG. 8 shows the temperature-entropy diagram for a typical organic compound, pyridine. The envelope leans to the right, and this is due to the high heat capacity of the liquid. Thus, a considerable proportion of heat is required to obtain saturated vapor at C'. For pyridine (as for most organic fluids) the vapor does not have to be superheated in order to avoid the formation of liquid upon expansion. In the ideal expansion from C' to D', D' is at the condenser pressure but slightly higher than the condenser temperature. If the vapor at D' is sent directly to the condenser, the small difference in the heat contained in the fluid between points D' and E' would be lost to the environment.

However, the real expansion from C' actually goes to point F', which is also at the condenser pressure. Point F' is well out in the superheat region, and if this fluid is sent directly to the condenser a considerable amount of heat would be lost to the environment. Rather than incurring such a loss, it is the usual practice in such a case to provide an additional heat exchanger whereby the heat available between F' and D' is recovered by preheating liquid from B'. This "preheating" step requires an additional heat exchanger usually referred to as a "regenerator". A flow diagram depicting such a system is shown in FIG. 9. An additional disadvantage of pyridine (and almost all other organic working fluids) is that the number of pounds of working fluid that must be recirculated is considerably higher than it is for water. Thus, the pump that pressurizes the fluid from A' to B' requires considerable power, and this reduces the overall cycle efficiency.

The temperature-entropy diagram for the preferred working fluid of the present invention, 40 wt. % water-60 wt. % pyridine, (the azeotropic composition) is depicted in FIG. 10. It is clear from the shape of the temperature-entropy curve and the real cycle shown that this fluid can be used in the basic Rankine Cycle. No additional regenerator is needed, and no additional reheat cycle is needed.

FIG. 11 shows a temperature-entropy diagram for a working fluid of this invention containing 25.5 wt. % water-74.5 wt. % pyridine. The same basic cycle can be used as that for the azeotrope shown in FIG. 10. The only difference is that in this case the vapors sent to the expander need not be superheated to obtain expanded vapors containing essentially no liquid. The fluids of this invention shown in FIGS. 10 and 11 can be used in the simple, basic Rankine Cycle shown in FIG. 12.

With the working fluids of this invention investment requirements for the Rankine Cycle system tend to be minimized. The simplicity of the system requires fewer controls and less maintenance. These factors are major concerns especially for small systems where cost and simplicity are important.

Water and the mono-cyclic nitrogen-containing hydrocarbons of this invention form homogeneous, minimum-boiling azeotropes. An azeotrope is characterized as having the same composition in the vapor as that in the liquid. This is an unusual property in that in ideal solutions the lower-boiling component tends to concentrate in the vapor. By homogeneous it is meant that when the vapor is condensed, the condensate is a single liquid. The compositions and boiling points at 1 atmosphere pressure of pyridine and other nitrogen-containing hydrocarbons of this invention are listed below in the Table.

TABLE

| | b.p. of pure compound (°C, atmospheric pressure) | b.p. of azeotrope (°C, atmospheric pressure) | wt. % water | wt. % nitrogen containing hydrocarbon |
|---|---|---|---|---|
| pyridine | 115.3 | 93.0 | 40.5 | 59.5 |
| 2-methyl pyridine (2-picoline) | 129.5 | 93.5 | 48.0 | 52.0 |
| 3-Methyl pyridine (3-picoline) | 144.1 | 97.0 | 60.0 | 40.0 |
| 4-methyl pyridine (4-picoline) | 143.3 | 97.4 | 63.5 | 36.5 |
| 1,4-diazine (pyrazine) | 115.5 | 95.5 | 40.0 | 60.0 |

The fact that these azeotropes are homogeneous is in contrast with the vast proponderance of azeotropes which consist of two immiscible liquids. Another class of azeotropes is homogeneous at the boiling point, but upon cooling forms two separate liquid layers. If water is one of the layers and the solubility of the organic compound in water is low, the water layer will have an undesirably high freezing point. The azeotropes in the Table above are homogeneous at the boiling point as well as at lower temperatures.

Figure 13:
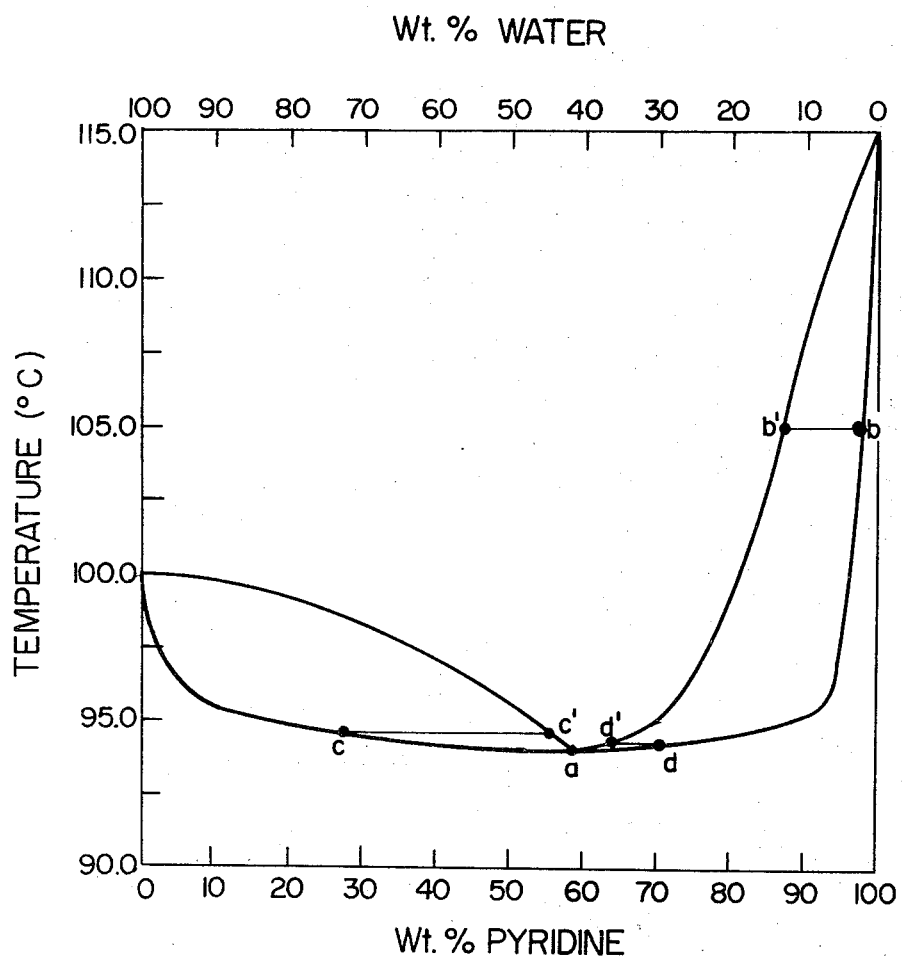

FIG. 13 shows the vapor-liquid equilibria in the water-pyridine system. This is a temperature-composition diagram in which temperature is plotted as the vertical axis and wt. % pyridine in water is plotted as the horizontal axis. The lower curve represents liquid compositions and the upper curve depicts vapor compositions. The azeotrope is shown at $a$. In this type of binary fluid the composition of the vapor in equilibrium with any liquid tends to approach that of the azeotrope. For example, composition $b$ which is high in pyridine is in equilibrium with vapor having composition $b'$, which has more *water* than $b$ and is closer to that of the azeotrope than is $b$.

In a similar manner, composition $c$, which has less pyridine than the azeotrope, is in equilibrium with vapor having composition $c'$. The vapor has more *pyridine* than $c$. This relationship is important and is to be contrasted with the situation in an ideal system illustrated in FIG. 14. In this case the analogous composition at $e$ is in equilibrium with $e'$. The vapor $e'$ contains *less* of the high-boiling component than $e$. As a matter of fact $e'$ contains hardly any of the high-boiling component. If the low-boiling component has a high freezing point, condensing and then cooling composition $e'$ could lead to a serious freeze-up problems. This is to be compared to effect in FIG. 13 where, as a result of the formation of an azeotrope the vapor $c'$ actually contains an *increased* pyridine concentration.

The increased pyridine concentration reduces the freezing point of condensed water vapor. This is an important discovery since in air-cooled Rankine Cycle systems, such as automobiles, vapors of the working fluid are present in the hot well, vapor generator, expander, piping, and condenser. The vapors throughout the system condense after a shut down, as the system cools. If water is the working fluid, its condensate can freeze and can cause serious blockages that would prevent the system from functioning after attempts are made to restart the system. However, with water-pyridine compositions on either side of the azeotrope, this possible freezing problem does not exist.

A second point to note is that a problem well-known in central station steam power plants is vapor-phase corrosion. Low-boiling acidic compounds that can build up in the recirculating working fluid leads to this vapor phase corrosion. The discovery that pyridine is an excellent corrosion inhibitor for water is useful in the vapor state, since the pyridine content of the vapor will always be high in the vapor. Thus pyridine in the vapor will neutralize the corrosivity of the acids in the vapor, and this is an important advantage resulting from the azeotropy.

Figure 14:
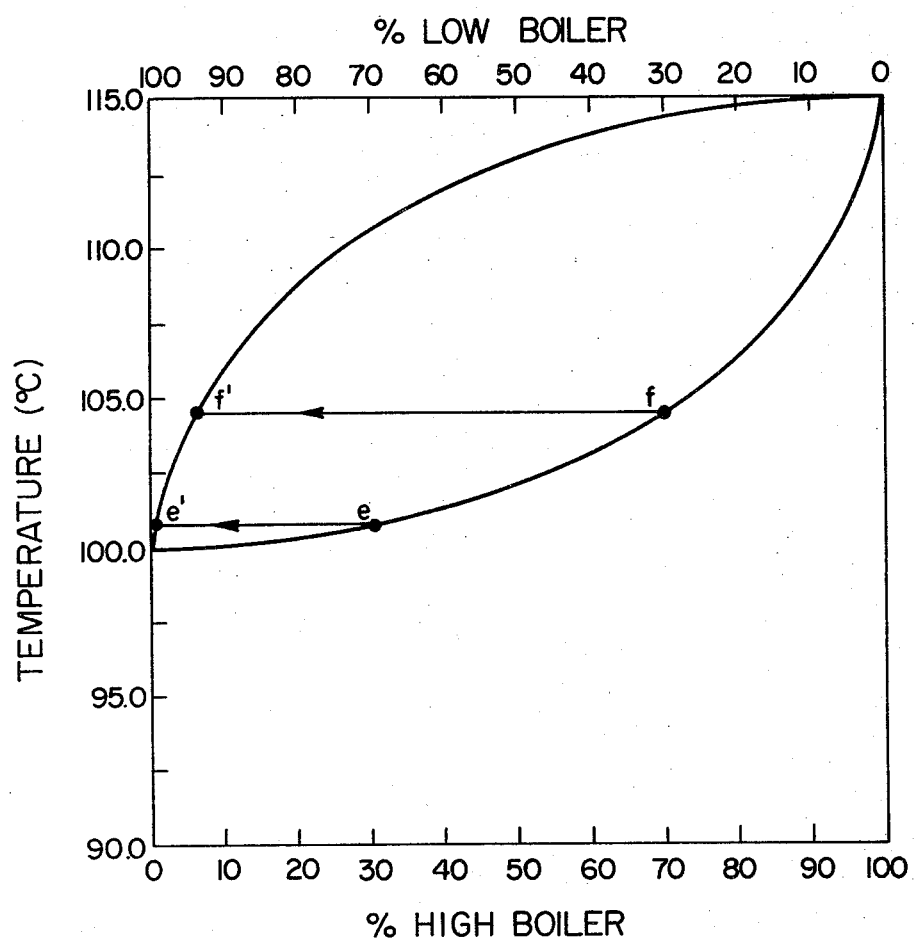

A third point of considerable importance resulting from the azeotropy is that the composition of the working fluid will not change very much, if a vapor leak develops in water-aromatic nitrogen-containing hydrocarbon fluids. For example, the vapor in equilibrium with 30 wt. %- 70 wt % pyridine (point $d$ on FIG. 13) has about 39 wt % water-61 wt. % pyridine (point $d'$). In FIG. 14 it can be seen that in an ideal system, point $f'$ has a drastically different composition than point $f$ at a 70 wt. % high-boiler content.

Leakage can be a very serious problem, since it is almost impossible to completely prevent leaks in Rankine Cycle systems. Leakage of vapor at composition $f'$ would very quickly deplete the main working fluid of its low-boiler content. The fluids of the present invention do not have this deficiency. As a matter of fact, at the azeotropic composition (point A, FIG. 5) there is no problem at all.

Figure 3:
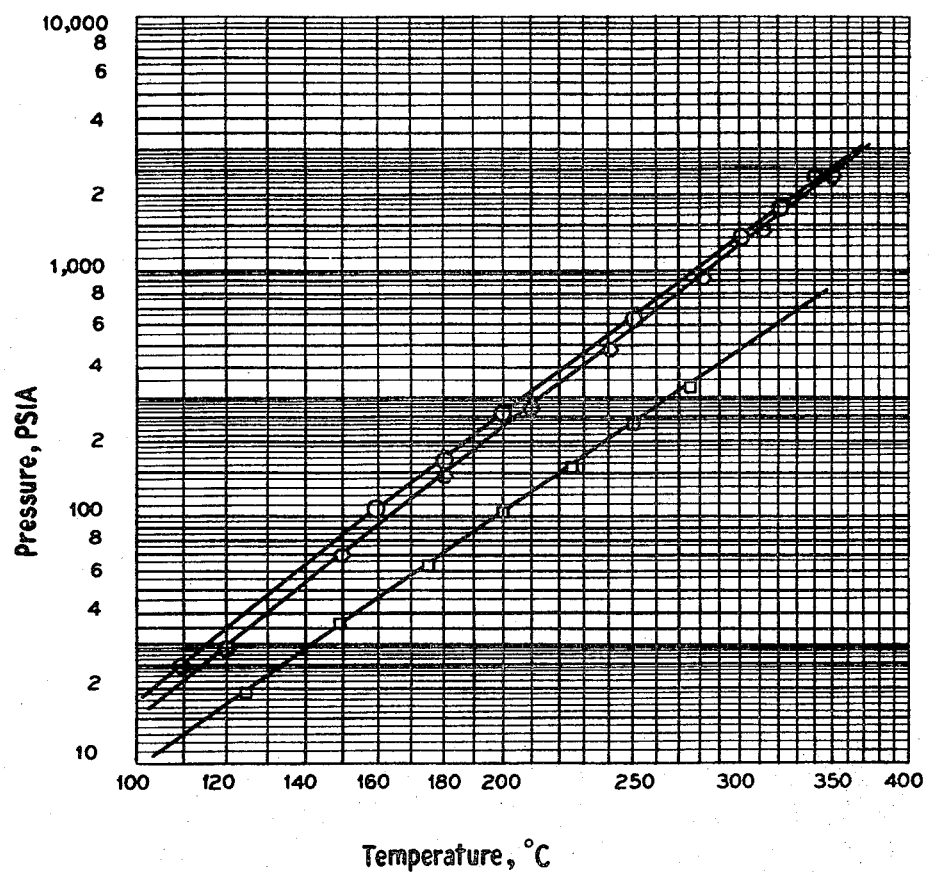

FIG. 3 depicts a comparison between the vapor pressure curves of a pyridine-water solution containing 60% by weight of pyridine, water alone and pyridine alone. The fact that the curve for the pyridine-water solution remains higher than that of water alone or pyridine alone is important because it is highly desirable to maintain high pressures at low temperatures to minimize the vacuum in the Rankine Cycle System when it is cooled thus preventing air leakage into the condenser of the engine upon cooling. It was also observed that the vapor pressure curve for this solution is nearly the same as that for a pyridine-water solution containing 74.5 wt. % pyridine. This fact is useful in that the Rankine Cycle System need not be changed if a user decides to change fluid compositions in order to obtain a lower freezing point fluid. This constancy of vapor pressure holds true over a wide compositional range namely from about 25 wt. % to about 90 wt. % of pyridine in various-pyridine-water solutions. This phenomenon is surprising because it would be unexpected from a general application of Raoult's Law.

Figure 15:
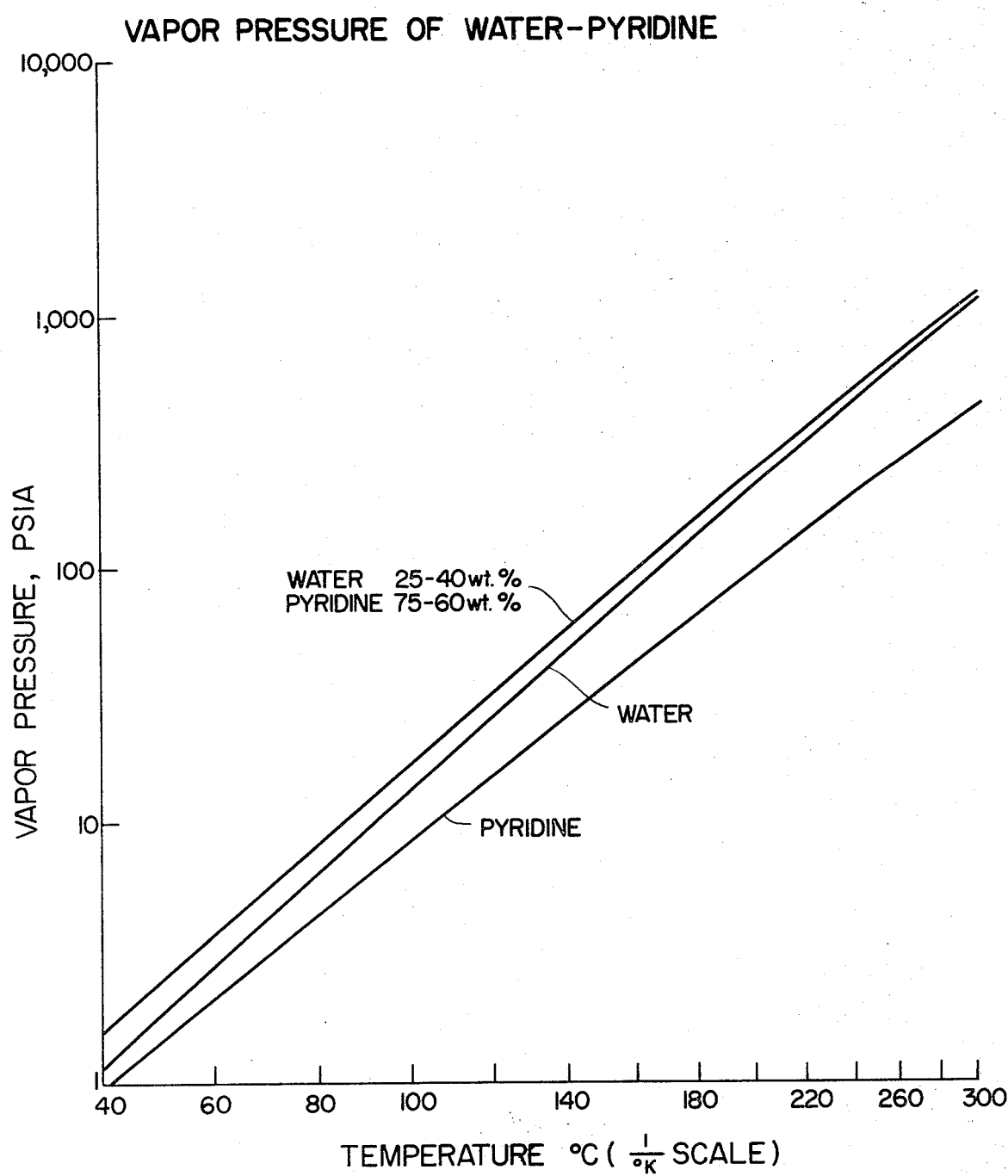

FIG. 15 demonstrates that 25 wt. % water-75 wt. % pyridine (a composition close to that of the azeotrope) and 40 wt. % water-60 wt. % pyridine (the azeotrope) have essentially the same vapor pressure curve. Referring back to FIG. 13, it is apparent that at 1 atmosphere pressure the boiling point is about the same over the very broad range of from about 20 weight pyridine to about 90 weight pyridine. The data of FIG. 15 lead to the conclusion that in the same broad composition range the vapor pressure as a function of temperature is not appreciably different.

This phenomenon is most unusual in that in an ideal solution at a set temperature the vapor pressure increases as the concentration of low-boiling component increases. Binary systems having constant vapor pressure result when the two components are partially soluble in each other. Thus, the phenomenon of constant vapor pressure versus composition for the fluids of the present invention are unexpected, because pyridine, for example, and water are completely soluble in each other at all temperatures.

This is an important discovery for a Rankine Cycle working fluid. In moderate climates it is preferred to employ the azeotrope; i.e., 40 wt. % water 60 wt. % pyridine which has a pour point of about 0°F. However, for extremely cold climates, it is desirable to increase the pyridine content so as to obtain a lower freezing point. For example, 25.5 wt. % water-74.5 wt. % pyridine has a pour point of about −40°F. Employing the working fluids of the present invention, the Rankine Cycle system need not be redesigned when the fluid composition is changed, since the vapor pressure in the boiler does not change, and the vapor pressure in the condenser does not change.

The vapor pressure of water and a mono-cyclic nitrogen-containing hydrocarbon of this invention is higher than either component by itself. FIG. 15 shows that the curve for water-pyridine tends to be above those of both water and pyridine. This is unexpected, since in ideal solutions the vapor pressure would lie somewhere between the vapor pressures of the two components. The synergism of increased vapor pressure is not much higher at high temperatures, but is of great advantage at low temperatures.

FIG. 15 shows that even though the vapor pressure of water-pyridine is considerable higher than that of water at low temperatures, the pressures at the high temperatures on the boiler, i.e., 300°C. and higher become almost equal. Thus excessive system pressures are not obtained with the working fluids of this invention compared to water, and this is unexpected considering the relatively higher pressures at low temperatures.

One of the problems with Rankine Cycle systems using steam-water is that when the system is shut down and the liquid water cools down near its freezing point, the pressure in the system becomes very low and this increases the chances of air leaking into the system. The presence of air in the system is undesirable because it impedes the proper operation of the condenser. The oxygen in the air can also lead to serious decomposition of working fluid and lubricant. The oxygen can also lead to serious corrosion problems.

Referring to FIG. 15 it can be seen that at low temperatures the pressure in the system with the working fluids of this invention would be considerably higher than it would be with water. Thus, at 40°C. water has a vapor pressure of 1.07 psia. However, water-pyridine has a vapor pressure of 1.50 psia, and this is 40% higher than that of water. This difference becomes even more remarkable as the freezing point of water is approached. This, then, is another important synergistic effect of the working fluids of this invention.

Figure 4:
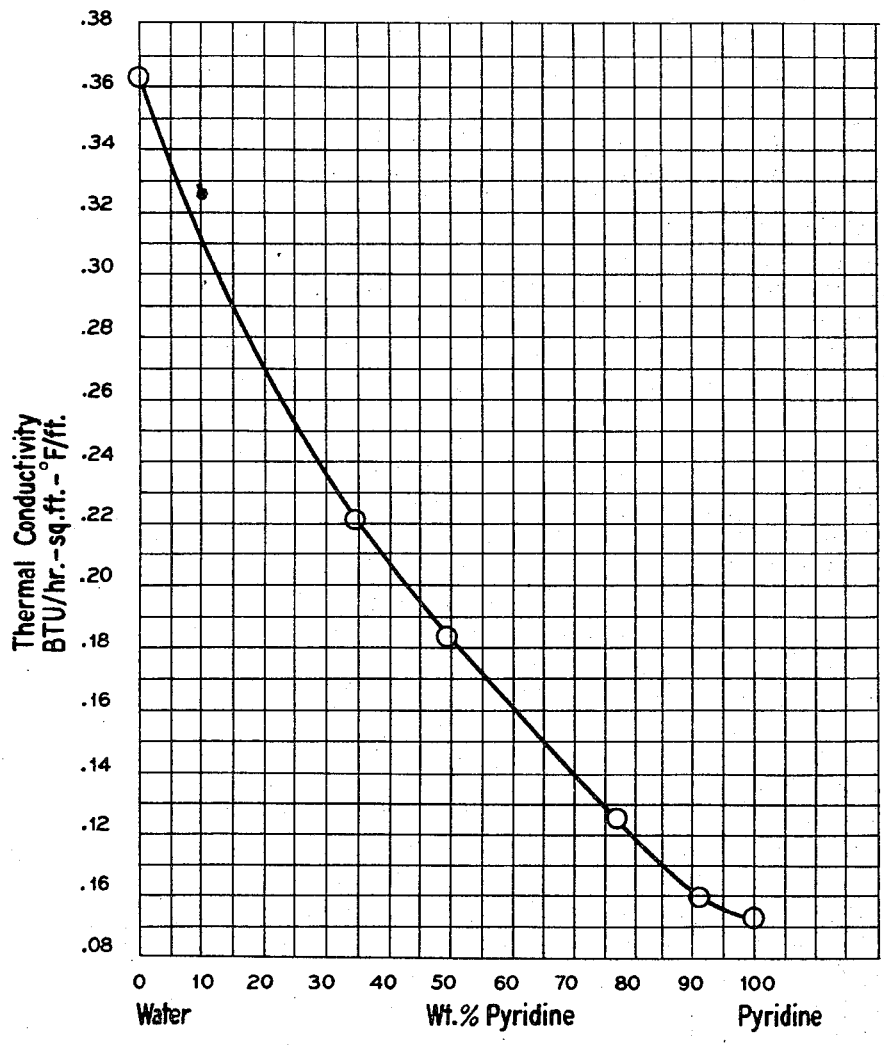

FIG. 4 demonstrates that although the thermal conductivity of water is higher the thermal conductivity of aqueous pyridine is superior to pyridine alone.

The thermal stability of a pyridine-water azeotrope containing 57 wt. % of pyridine was demonstrated by heating such a solution in a stainless steel, high-pressure, rocker bomb under nitrogen for 24 hours at 300°C. and 400°C. respectively. In both experiments it was found that pyridine decomposition was negligible.

Using the same rocker bomb, the excellent corrosion properties of the same pyridine-water azeotrope was demonstrated by charging coupons of rust free 1010 carbon steel and oxide free 6061 aluminum together with the azeotrope. A temperature of 400°C. was maintained for 168 hours. The steel was found to blacken and its corrosion was measured as being about 1.65 mils per year. The aluminum formed a very stong protective film that could not be removed even by scrubbing with 5% aqueous phosphoric acid. The pyridine degraded to the extent of only about 1.7% of that originally present. When the same experiment was repeated with the exception that aluminum was omitted from the rocker bomb, the corrosion rate of the steel coupon was found to be 1.6 mils per year and only 0.5% of the pyridine originally present decomposed.

In order to simulate condenser corrosion, coupons of 1010 carbon steel were placed in round bottom flask covered with pyridine-water azeotrope containing 57 wt. % pyridine and the system boiled at atmospheric pressure under total reflux for 72 hours. It was found that the corrosion rate for the carbon steel was 1.4 mils per year. The pyridine solution was observed to be clear and colorless. As a Control 1010 carbon steel coupons were exposed to boiling water for 72 hours and it was found that the corrosion rate of the steel was 3.0 mils per year.

For most solutions of liquid organic chemicals in water, the flash point of the liquid does not increase very much with the addition of water. It is only after large proportions of water are added that the flash point increases to a high level. Thus, adding 10, 20 or even 30 wt. % water to methyl alcohol does not raise the flash points very much, and the flammability of the methyl alcohol is not reduced significantly.

On the other hand, addition of about 30 wt. % water to pyridine raises the flash point by 35°F. The very high increase in the flash point with relatively small additions of water is unexpected, and is an advantage of this working fluid.

It is thus readily apparent that the aqueous mono-cyclic nitrogen-containing hydrocarbon working fluids of this invention are superior to prior art compositions in that they exhibit excellent temperature-entropy curves and a single vapor pressure curve, possess lower freezing points than water alone, form azeotropes which afford the same composition in either the liquid or the vapor state and inhibit the corrosive properties of water on steel.

Although the invention has been described in its preferred forms with a certain degree of particularity, it is understood that the present disclosure of the preferred form has been made only by way of example, and that numerous changes and details may be resorted to without departing from the spirit and scope of the invention.

What is claimed is:

1. Method of converting heat energy to mechanical energy which comprises heating an aqueous nitrogen-containing hydrocarbon working fluid, to the vapor state, said working fluid containing about 25 to 90 percent by weight of a mono-cyclic nitrogen-containing hydrocarbon selected from the group consisting of pyridine, 2-methyl pyridine, 3-methyl pyridine, 4-methyl pyridine, 2,6-dimethyl pyridine, 1,2-diazine, 1,3-diazine and 1,4-diazine, and utilizing the energy of the vaporized working fluid to perform work.

2. Method claimed in claim 1 wherein the monocyclic nitrogen containing hydrocarbon is pyridine.

3. Method claimed in claim 1 wherein the monocyclic nitrogen containing hydrocarbon is 2-methyl pyridine.

4. Method claimed in claim 1 wherein the monocyclic nitrogen containing hydrocarbon is 3-methyl pyridine.

5. Method claimed in claim 1 wherein the monocyclic nitrogen containing hydrocarbon is 4-methyl pyridine.

6. Method claimed in claim 1 wherein the monocyclic nitrogen containing hydrocarbon is 2,6-dimethyl pyridine.

7. Method claimed in claim 1 wherein the monocyclic nitrogen containing hydrocarbon is 1,2-diazine.

8. Method claimed in claim 1 wherein the monocyclic nitrogen containing hydrocarbon is 1,3-diazine.

9. Method claimed in claim 1 wherein the monocyclic nitrogen containing hydrocarbon is 1,4-diazine.

10. Method claimed in claim 1 wherein the heat energy is converted to mechanical energy in a Rankine Cycle engine system.

11. Method claimed in claim 10 wherein the working fluid contains about 50 to 80 per cent by weight of a mono-cyclic nitrogen-containing compound.

* * * * *